US009913997B2

(12) United States Patent
Kearney-Fischer et al.

(10) Patent No.: US 9,913,997 B2
(45) Date of Patent: Mar. 13, 2018

(54) RESPIRATORY GAS MONITORING

(71) Applicant: Lockheed Martin Corporation, Bethesda, MD (US)

(72) Inventors: Martin Anthony Kearney-Fischer, Valencia, CA (US); Sarah Kathleen Mottino, Lancaster, CA (US); Charles J. Chase, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 896 days.

(21) Appl. No.: 13/948,561

(22) Filed: Jul. 23, 2013

(65) Prior Publication Data
US 2015/0027442 A1   Jan. 29, 2015

(51) Int. Cl.
*A62B 9/00* (2006.01)
*B29C 70/82* (2006.01)
*A62B 18/08* (2006.01)
*A62B 7/14* (2006.01)
*B29L 31/00* (2006.01)

(52) U.S. Cl.
CPC .............. *A62B 9/006* (2013.01); *A62B 18/08* (2013.01); *B29C 70/82* (2013.01); *A62B 7/14* (2013.01); *B29L 2031/752* (2013.01); *B29L 2031/753* (2013.01)

(58) Field of Classification Search
CPC .......... A61M 16/0488; A61M 16/0493; A61M 16/0495; A61M 16/0633; A61M 16/0825; A61M 16/0833; A61M 16/0078; A61M 16/06; A61M 16/0816; A61M 16/0463; A61M 16/0683; A61M 16/208; A61M 16/00; A61M 16/20; A61M 16/04; A61M 2016/0493; A61M 16/10; A61M 16/0051; A61M 16/0611; A61M 16/0616; A61M 16/0622; A61F 5/566; B29C 70/82; B29L 2031/752; B29L 2031/753; A62B 9/06; A62B 1/00154; A62B 1/00165; A62B 1/2676
USPC ............ 128/200.24, 200.26, 202.27, 202.28, 128/202.29, 203.11, 203.21, 204.22, 128/205.23, 205.24, 205.25, 206.21, 128/206.24, 206.27, 207.11; 600/309, 600/310, 311, 532; 264/1.24
See application file for complete search history.

(56) References Cited

U.S. PATENT DOCUMENTS

| 7,040,319 B1 | 5/2006 | Kelly et al. | |
| 7,997,268 B1* | 8/2011 | Leonard | A61D 7/04 128/203.12 |
| 2003/0175511 A1* | 9/2003 | Asai | C08G 61/04 428/355 R |

(Continued)

FOREIGN PATENT DOCUMENTS

WO   WO 2011/161414 A1   12/2011

*Primary Examiner* — Todd S Scherbel
*Assistant Examiner* — Elliot S Ruddie
(74) *Attorney, Agent, or Firm* — Reising Ethington P.C.; Eric Jones

(57) ABSTRACT

A device for monitoring gases present in a breathing mask. A gas sensing element carried by the breathing mask senses the partial pressure of a gas present in the breathing mask and outputs signals corresponding to the sensed gas partial pressure. The gas sensing element may comprise a gas-sensing material configured to emit, in response to light excitation, an optical signal at an intensity corresponding to the partial pressure of a sensed gas.

12 Claims, 4 Drawing Sheets

(56) References Cited

U.S. PATENT DOCUMENTS

| | | | |
|---|---|---|---|
| 2004/0050143 A1* | 3/2004 | Hoagland | G01N 21/783 73/31.05 |
| 2004/0163648 A1* | 8/2004 | Burton | A61B 5/04085 128/204.21 |
| 2008/0202209 A1* | 8/2008 | Lambkin | G01J 1/04 73/31.05 |

* cited by examiner

RESPIRATORY GAS MONITORING

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to monitoring gases present in a breathing mask.

Description of Related Art Including Information Disclosed Under 37 CFR 1.97 and 1.98

Breathing masks, such as those used by aircrew, must be relied on to provide a consistent mix of gases sufficient to sustain a human in spite of variable ambient air density and toxicity. This task becomes especially challenging when the mask user is placed under physical strain, where variables such as increased respiration can increase the levels of carbon dioxide in the mask even as the user's need for oxygen increases. Currently, most aircraft provide manual controls to allow aircrew to increase oxygen flow if needed, but threats such as histotoxic hypoxia can easily go unnoticed by the afflicted, and most aircrew have no way to objectively gauge the contents of their breathing masks.

SUMMARY

A respiratory gas monitoring device is provided for monitoring gases present in a breathing mask. The device may comprise a breathing mask configured to be worn by a subject and to deliver gases to the subject for respiration. A first gas sensing element may be carried by the breathing mask and may comprise a gas-sensing material configured to emit, in response to light excitation, an optical signal at an intensity corresponding to a partial pressure of a sensed gas.

A method is also provided for making a respiratory gas monitoring device. The method may include the steps of forming a breathing mask, embedding an optical fiber in a wall of the mask, and supporting a gas sensing element on the mask in optical communication with the optical fiber.

DRAWING DESCRIPTIONS

These and other features and advantages will become apparent to those skilled in the art in connection with the following detailed description and drawings of one or more embodiments of the invention, in which.

DETAILED DESCRIPTION

Figure 1:
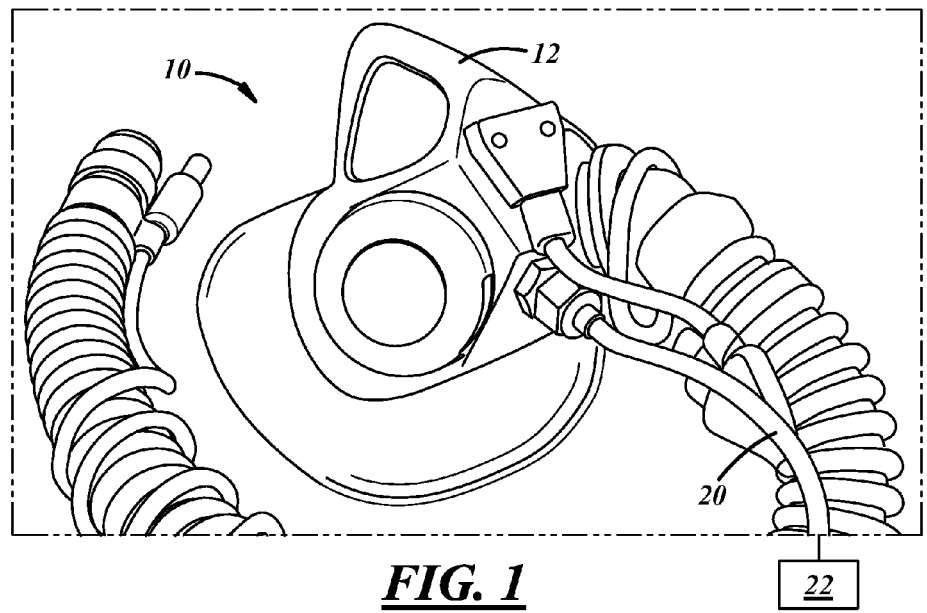
FIG. 1 is a partially schematic perspective view of an aircrew breathing mask having a respiratory gas monitoring device installed.
Figure 2:
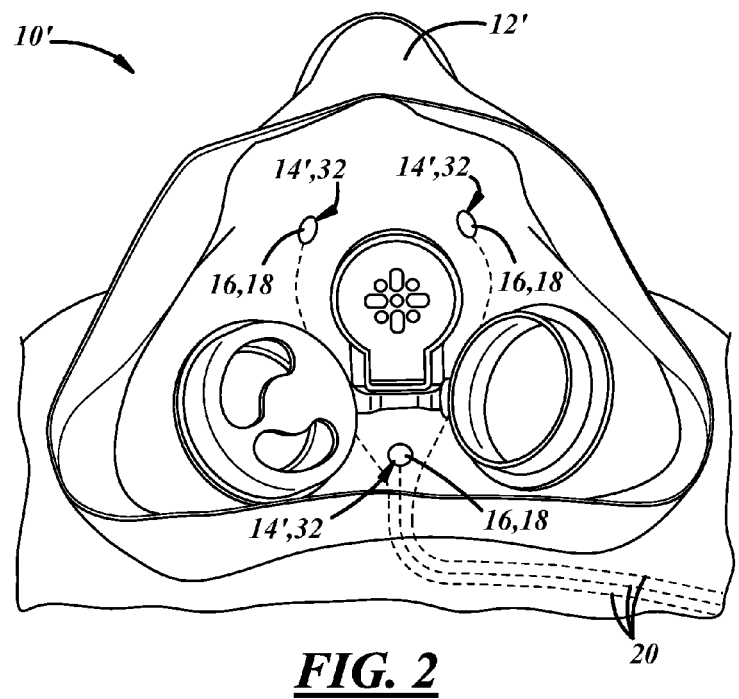
FIG. 2 is a rear perspective view looking inside the breathing mask of FIG. 1 and showing an array of three gas sensing elements of the monitoring device as well as three hidden optical fibers leading to the gas sensors.
Figure 3:
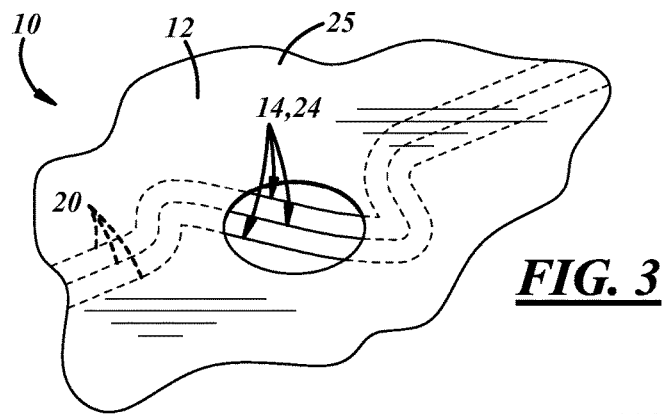
FIG. 3 is a perspective view of an alternative gas sensing element array comprising optical fibers partially exposed in an inner surface of an breathing mask and coated with a luminophore-binder mixture.
Figure 4:
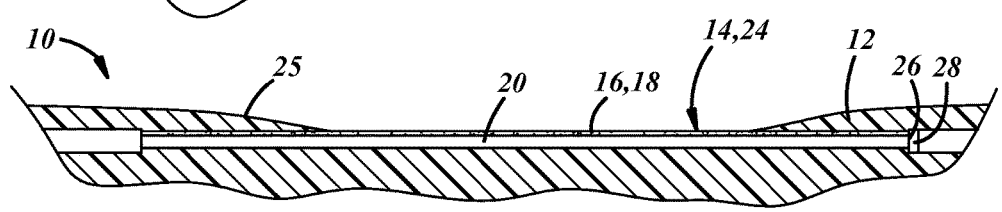
FIG. 4 is a cross-sectional view of the mask and one gas sensing element of the alternative gas sensing element array of FIG. 3.

A device that monitors partial pressures of gases present in a breathing mask is generally shown at 10 in FIGS. 1, 3, and 4. A second embodiment of the device is generally shown at 10' in FIGS. 2, 9, and 10, a third embodiment is generally shown at 10" in FIGS. 5 and 6, and a fourth embodiment is generally shown at 10''' in FIGS. 7 and 8. Reference numerals with the designation prime (') double prime (") or triple prime ('") in FIGS. 2 and 5-10, indicate alternative configurations of elements that also appear in the first embodiment. Unless indicated otherwise, where a portion of the following description uses a reference numeral to refer to FIGS. 1, 3, and 4, that portion of the description applies equally to elements designated by primed numerals in the other figures.

The device 10 may include a plastic breathing mask 12 configured to be worn by a subject and to deliver gases to the subject for breathing One or more gas sensing elements 14 may be carried by the breathing mask 12 and may each be configured to sense the partial pressure of a gas in the breathing mask 12 and to output signals corresponding to the sensed gas partial pressure. Each gas sensing element 14 may comprise one or more gas-sensing materials 16 that may be configured to emit, in response to light excitation, optical signals at an intensity corresponding to the partial pressure of the sensed gas. The partial pressure of the sensed gas may be reported or the concentration of the gas may be reported on a parts-per-million (PPM) basis.

Each gas-sensing material 16 may comprise a luminophore suspended in a binder material to form a luminophore-binder mixture 18. The luminophore may preferably be a member of the Ruthenium(II) family of fluorescent compounds and may be tailored depending upon the analyte of interest, the desired sensing range/accuracy, and/or the environmental conditions that a gas sensing element 14 bearing the luminophore will be exposed to. The formulations of luminophore compounds used in the gas sensing elements 14 may be proprietary information owned by manufacturers of commercially-available gas sensing elements, but may, for example, include tris(4,7-diphenyl-1,10-phenanthroline) ruthenium(II) [aka $(Ru(dip)_3)^{2+}$] and Ru(II) poly(pyridyl) complex. Formulations of binder compositions used in the luminophore-binder mixture 18 are also generally considered to be a proprietary component of manufacturers of commercially-available gas sensing elements, but may, for example, be based on either sol-gel or Poly-Vinyl Chloride (PVC) compounds. The formulations of binder and the luminophore compounds may both be optimized to achieve desired sensitivity, range, and environmental robustness of the gas sensing elements 14.

The luminophore-binder mixture 18 may be selected for its sensitivity to the presence of a molecule of a gas to be sensed, upon light excitation of the luminophore. Where the device 10 includes multiple gas sensing elements 14, different gas-sensing materials 16 comprising various luminophore-binder mixtures 18 may be selected for each gas sensing element 14 so that the mixtures 18 are configured to be sensitive to different respective molecules or attributes of different gases to be sensed, upon light excitation of the respective mixtures 18.

One or more optical fibers 20 may be carried by and embedded at least partially in the mask 12 in respective positions where they are in optical communication with the gas sensing elements 14. The optical fibers 20 may be configured to transmit optical signals received from the gas sensing elements 14.

The gas sensing elements 14 may thus be configured to report individual and/or collective attributes of various gases present within the mask 12. For example: the device 10 may include five gas sensing elements 14 configured to sense of the presence of oxygen, the presence of carbon dioxide, total pressure, temperature, and relative humidity, respectively. One or more of the gas sensing elements 14 may also or alternatively be configured to sense the presence and/or the proportion of exotic gas molecules present in a breathing mask. The presence of such molecules may be reported on a parts-per-million (PPM) basis rather than as a partial pressure value. The gas sensing elements 14 may transmit optical signals via five optical fibers 20 that may be at least partially embedded in the mask 12. The optical fibers 20 may converge to exit the mask 12 via a reusable fitting.

The device 10 may include a processor 22 coupled to output ends of the optical fibers 20 as shown in FIG. 1. The processor 22 may be configured to identify and determine the relative partial pressures of the gases sensed by the gas sensing elements 14 in the breathing mask 12 in response to the intensity of optical signals received from the respective sensing elements 14. Data collected by the processor 22 may then be stored or relayed to operators or other automated systems. For example, the processor 22 may detect a non-optimal gas composition in the mask 12 and, in response to such detection, activate a warning system to alert the mask user to the danger. The processor 22 may also be configured to enable manual or automatic adjustment of such parameters as gas flow rate, to correct detected problems.

Each gas sensing element 14 may comprise a layer of the gas sensing material 16 carried by, and coating, at least a portion 24 of an optical fiber 20. As shown in FIGS. 3 and 4, the coated portion 24 may be a length of the optical fiber 20 spaced from the fiber's ends. At least a portion of the coated portion 24 of each optical fiber 20 may be exposed through an inner surface 25 of the mask 12 to gases within the breathing mask 12. At least a portion of the remainder of the optical fiber 20 may be embedded within the material of the mask 12. As shown in FIG. 4, a distal end 26 of each optical fiber 20 may be embedded within the mask 12, and a mirror 28 may be disposed at or adjacent to, and in optical communication with the distal end 26 of each optical fiber 20 and positioned to reflect light that's been transmitted to the distal end 26, back along the fiber 20.

Figure 9:
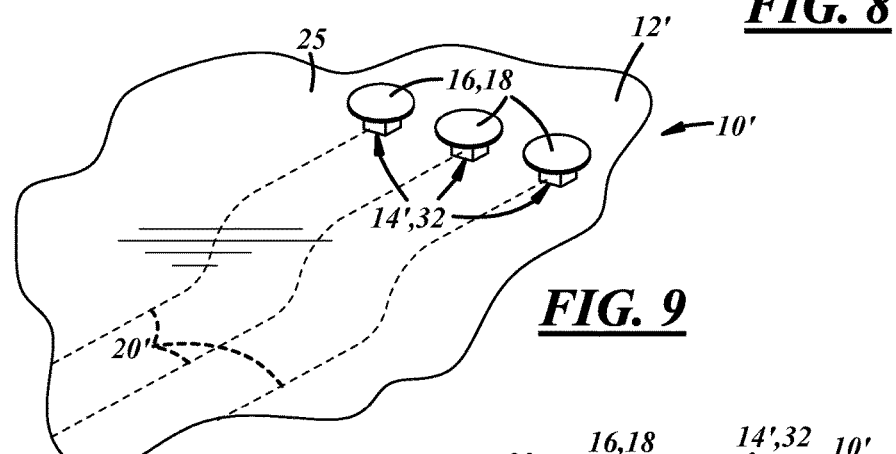
FIG. 9 is a perspective view of an alternative gas sensing element array carried by a breathing mask and comprising removable patches that each comprise luminophore material.
Figure 10:
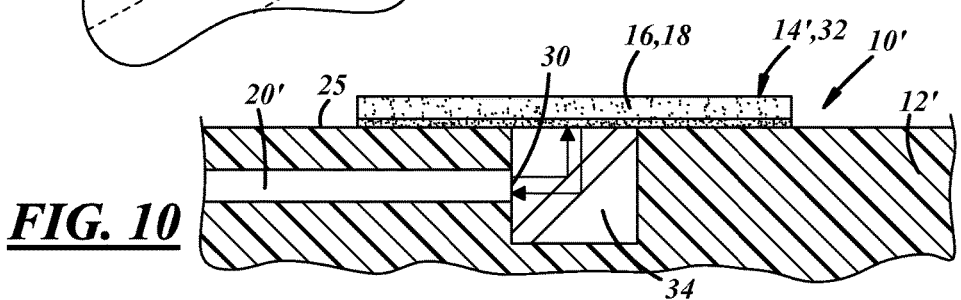
FIG. 10 is a partial cross-sectional view of the mask, one of the sensing elements of FIG. 9, a connecting optical fiber, and a turning mirror providing optical communication between the sensing element and the connecting optical fiber.

According to the second embodiment, input ends 30' of the optical fibers 20' may be embedded within the mask 12', and the sensing elements 14' may be removably mounted on the mask 12' in optical communication with input ends 30' of the respective optical fibers 20' as shown in FIGS. 9 and 10. Each sensing element 14' may comprise an adhesive patch 32 configured to be removably applied to the breathing mask inner surface 25. Each adhesive patch 32 may comprise or carry a gas-sensing material 16. An optical steering element 34 such as a turning mirror or beam splitter cube may be embedded within the mask surface adjacent each optical fiber input end 30' and below each adhesive patch 32. Each optical steering element 34 may be configured and positioned to collect optical signals emitted by its respective adhesive patch 32 and direct the optical signals into its respective optical fiber 20'. This configuration protects the optical fibers 20' from damage, and allows spent gas-sensing mixtures 18 to be easily replaced by replacing the adhesive patches 32.

Figure 5:
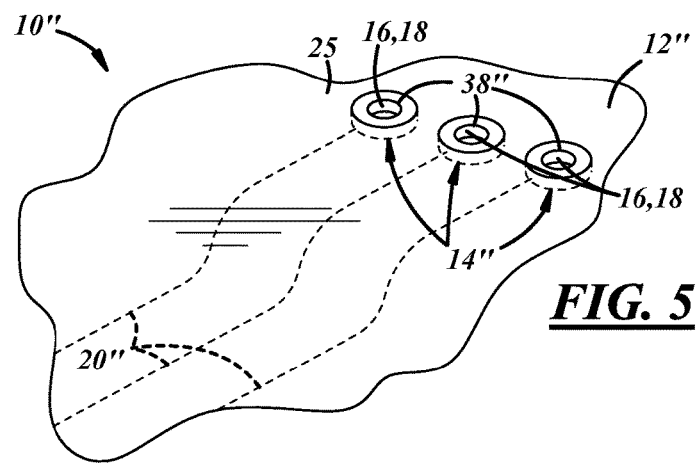
FIG. 5 is a perspective view of an alternative gas sensing element array comprising removable annular plugs coated on an inner circumferential surface with a luminophore-binder mixture in optical communication with a connecting optical fiber.
Figure 6:
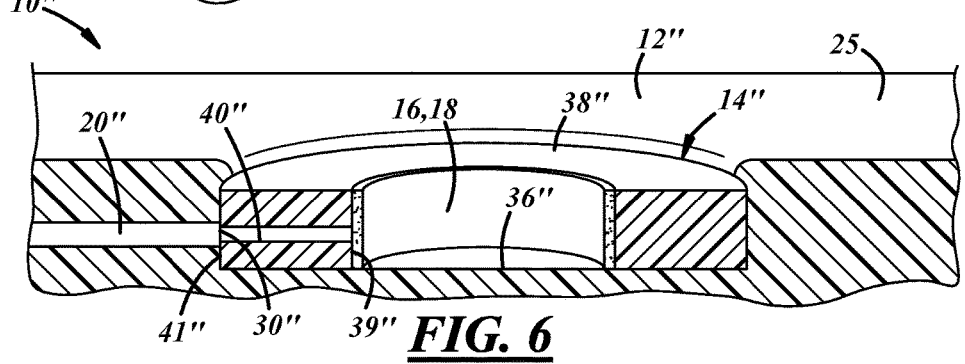
FIG. 6 is a partial cross-sectional perspective view of the mask and one of the gas sensing elements of FIG. 5.
Figure 7:
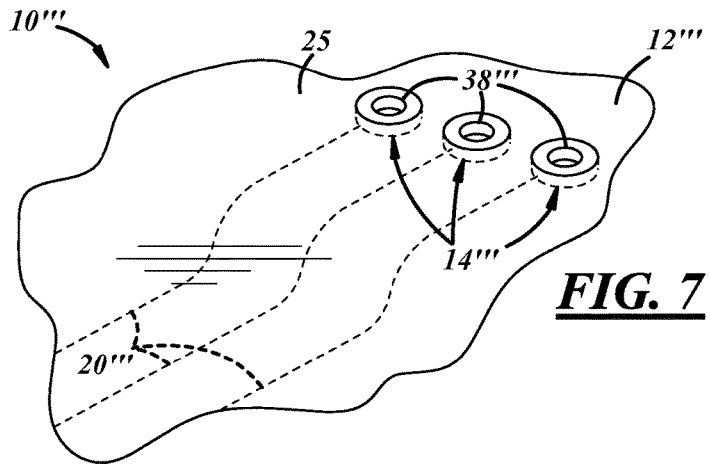
FIG. 7 is a perspective view of an alternative gas sensing element array carried by a breathing mask and comprising removable annular plugs that each carries a plug of luminophore-binder mixture in a radial plug aperture and in optical communication with a connecting optical fiber.
Figure 8:
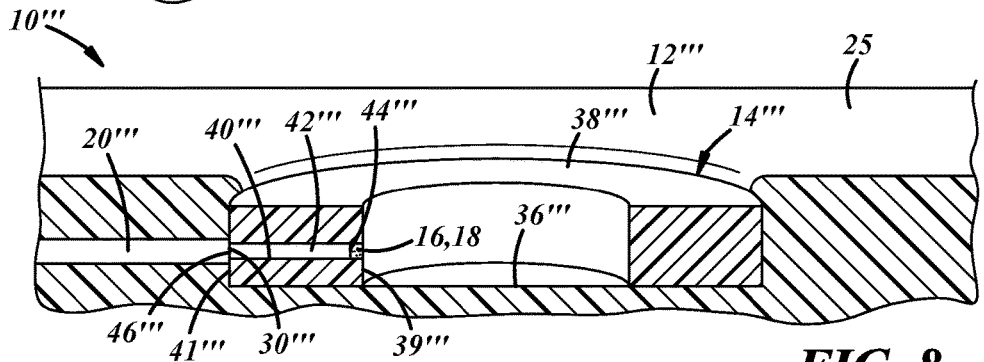
FIG. 8 is a partial cross-sectional perspective view of the mask, one of the gas sensing elements of FIG. 7, and the connecting optical fiber.

According to the third and fourth embodiments shown in FIGS. 5-8, the device 10", 10''' may include one or more generally cylindrical recesses or plug sockets 36", 36''' formed in an inner surface 25 of the breathing mask 12", 12''' as best shown in FIGS. 6 and 8. In other embodiments the plug sockets 36", 36''' may have any suitable shape and any number of optical fibers 20", 20''' may be disposed adjacent and in optical communication with each socket. Each gas sensing element 14", 14''' may comprise an annular plug 38", 38''' configured to be removably received within the socket 36", 36'''.

According to the third embodiment, a layer of the gas sensing material 16 may be carried by, and may coat, at least a portion of an inner circumferential surface 39" of each plug 38" as shown in FIGS. 5 and 6. Each gas sensing element 14" may also comprise a radial plug aperture 40" extending from an outer circumferential surface 41" to the inner circumferential surface 39" of its respective plug 38" and may be configured to allow optical signals to pass from the gas sensing material 16 coating the inner circumferential surface 39" of the annular plug 38" to the input end 30" of one of the optical fibers 20" when the plug 38" is placed in the socket 36" such that the input end 30" of the optical fiber 20" and the radial plug aperture 40" are aligned. In other embodiments, each gas sensing element 14" may comprise any number of radial plug apertures 40" extending from the outer circumferential surface 41" of the plug to the inner circumferential surface 39" and spaced circumferentially from one another in positions alignable with the input ends 30" of respective optical fibers 20".

According to the fourth embodiment, shown in FIGS. 7 and 8, a radial optical fiber plug 42 may be received by a radial plug aperture 40''' extending from the outer circumferential surface 41''' of the annular plug 38''' to its inner circumferential surface 39''' as best shown in FIG. 8. An input end 44 of the optical fiber plug 42 may be disposed adjacent the inner circumferential surface 39''' of the annular plug 38'''. A layer of the gas sensing material 16 may be carried by, and may coat, the radial plug optical fiber input end 44. An output end 46 of the radial optical fiber plug may be disposed adjacent the outer circumferential surface 41''' of the annular plug 38''' in a position alignable with, and providing optical communication with, the input end 30''' of the optical fiber 20''' such that optical signals may pass from the radial optical fiber plug 42''' to the optical fiber 20''' when the annular plug 38''' is placed in the socket 36''' such that the input end 30''' of the optical fiber 20''' and the output end 46 of the radial optical fiber plug are aligned. In other embodiments, any number of optical fibers 20''' may be disposed with respective input ends 44 adjacent and in optical communication with each socket 36''', and any number of radial optical fiber plugs 42 may be received by any number of radial plug apertures 40''' and configured and positioned to be alignable with and to provide optical communication with the input ends 30''' of the optical fibers 20'''.

Figure 11:
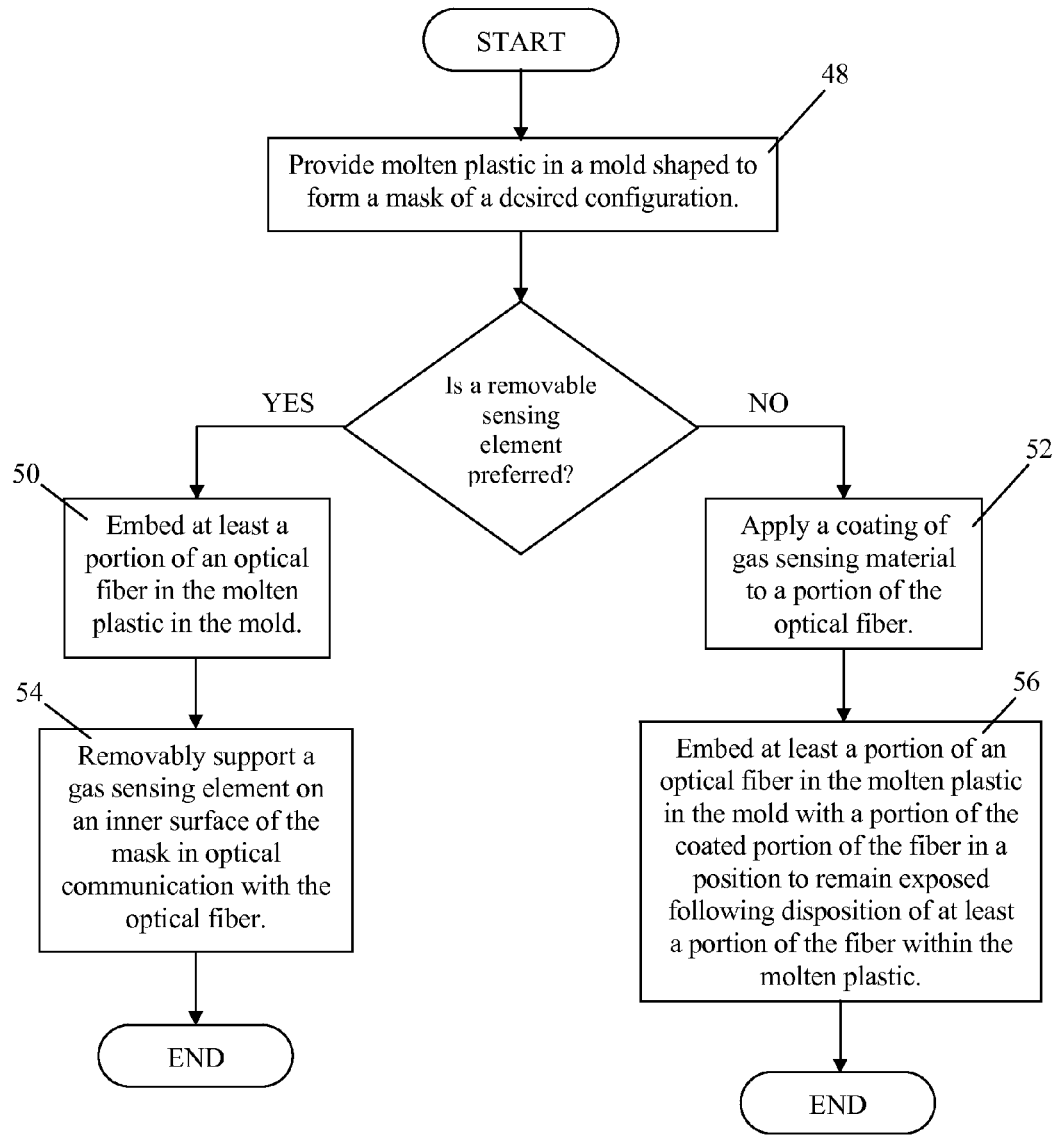
FIG. 11 is a flowchart showing a method for making a respiratory gas monitoring device.

As shown in FIG. 11, respiratory gas monitoring device 10 may be constructed by forming a breathing mask 12, which may be accomplished by introducing a suitable material such as molten plastic into a mold shaped to form a mask 12 of desired configuration as shown in Action Step 48. One or more optical fibers 20 may be embedded in a wall of the mask 12 by disposing at least a portion of each optical fiber 20 in the molten plastic in the mold before allowing the plastic to solidify as shown in Action Step 50. In some embodiments, each optical fiber 20 may be disposed in a position where at least a portion of a coated portion 24 of each fiber 20 will remain exposed at the end of the molding process as shown in Action Step 56.

One or more gas sensing elements 14 may be supported on the mask 12 in optical communication with the optical fibers 20. In some embodiments, gas sensing material 16 may be applied to the exposed portion of each optical fiber 20 before the fiber is embedded in the mask as shown in Action Step 52. In other embodiments each gas sensing element 14 may be removably supported on an inner surface 25 of the breathing mask 12 in optical communication with each optical fiber 20 as shown in Action Step 54.

A respiratory gas monitoring device constructed as described above allows real-time monitoring of the air in an breathing mask, providing critical data that can be used for research, or to quickly prevent, detect, and counteract threats to aircrew health. The device adds no appreciable weight to the mask, thus providing no noticeable disadvantage when used by aircrew in high G environments such as may be encountered in combat aircraft, or when used in other physically demanding environments by, e.g., first responders, divers, etc.. The embedding process protects the otherwise fragile optical fibers from damage.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A respiratory gas monitoring device for monitoring gases present in a breathing mask, the device comprising:
    a breathing mask;
    a plug socket formed in an inner surface of the breathing mask;
    a first gas sensing element comprising an annular plug removably received within the socket, and a layer of gas-sensing material that, once excited, emits an optical signal in response to interaction of the gas-sensing material with a sensed gas and at an intensity corresponding to a partial pressure of the sensed gas;
    a first optical fiber carried by the mask and in optical communication with the first gas sensing element to transmit optical signals received from the first gas sensing element;
    an end of the first optical fiber being disposed in optical communication with the plug socket; and
    the first gas sensing element comprising:
        the layer of the gas sensing material carried by at least a portion of an inner circumferential surface of the annular plug; and
        at least one radial plug aperture extending from an outer circumferential surface to the inner circumferential surface of the annular plug and configured to allow optical signals to pass from the gas sensing material coating the inner circumferential surface of the annular plug to the input end of the first optical fiber.

2. A respiratory gas monitoring device as defined in claim 1 in which the first gas-sensing material comprises a first luminophore.

3. A respiratory gas monitoring device as defined in claim 2 in which the first gas-sensing material comprises a first binder and the first luminophore is suspended in the first binder to form a first luminophore-binder mixture.

4. A respiratory gas monitoring device as defined in claim 3 in which at least one of the first luminophore or first binder are selected for sensitivity to a molecule of a first gas to be sensed upon light excitation of the first luminophore.

5. A respiratory gas monitoring device as defined in claim 4 and further including a second gas sensing element carried by the breathing mask and comprising a gas-sensing material configured to emit, in response to light excitation, an optical signal at an intensity corresponding to a partial pressure of a sensed gas, the second gas-sensing material comprising a second luminophore-binder mixture comprising a second luminophore suspended in a second binder, the second luminophore and second binder being selected for sensitivity to a molecule of a second gas to be sensed upon light excitation of the second luminophore, and a second optical fiber carried by the mask and in optical communication with the second gas sensing element, the second optical fiber being configured to transmit optical signals received from the second gas sensing element.

6. A respiratory gas monitoring device as defined in claim 1 in which the device includes a processor coupled to an output end of the optical fiber and configured to identify and determine the partial pressure of the gas present in the breathing mask in response to the optical signals received from the sensing element.

7. A respiratory gas monitoring device for monitoring gases present in a breathing mask, the device comprising:
    a breathing mask;
    a plug socket formed in an inner surface of the breathing mask;
    a first gas sensing element comprising an annular plug removably received within the socket, and a layer of gas-sensing material that, once excited, emits an optical signal in response to interaction of the gas-sensing material with a sensed gas and at an intensity corresponding to a partial pressure of the sensed gas;
    a first optical fiber carried by the mask and in optical communication with the first gas sensing element to transmit optical signals received from the first gas sensing element;
    an input end of the first optical fiber being disposed adjacent the socket; and
    the first gas sensing element comprising:

at least one radial plug aperture extending from an outer circumferential surface to an inner circumferential surface of the annular plug;

an optical fiber plug received by the radial plug aperture and having an input end disposed adjacent the inner circumferential surface of the annular plug, an output end of the optical fiber plug being disposed adjacent the exterior circumferential surface of the annular plug in a position providing optical communication with the input end of the first optical fiber; and the layer of the gas sensing material carried by the radial plug optical fiber input end.

8. A respiratory gas monitoring device as defined in claim 7 in which the first gas-sensing material comprises a first luminophore.

9. A respiratory gas monitoring device as defined in claim 8 in which the first gas-sensing material comprises a first binder and the first luminophore is suspended in the first binder to form a first luminophore-binder mixture.

10. A respiratory gas monitoring device as defined in claim 9 in which at least one of the first luminophore or first binder are selected for sensitivity to a molecule of a first gas to be sensed upon light excitation of the first luminophore.

11. A respiratory gas monitoring device as defined in claim 10 and further including a second gas sensing element carried by the breathing mask and comprising a gas-sensing material configured to emit, in response to light excitation, an optical signal at an intensity corresponding to a partial pressure of a sensed gas, the second gas-sensing material comprising a second luminophore-binder mixture comprising a second luminophore suspended in a second binder, the second luminophore and second binder being selected for sensitivity to a molecule of a second gas to be sensed upon light excitation of the second luminophore, and a second optical fiber carried by the mask and in optical communication with the second gas sensing element, the second optical fiber being configured to transmit optical signals received from the second gas sensing element.

12. A respiratory gas monitoring device as defined in claim 7 in which the device includes a processor coupled to an output end of the optical fiber and programmed to identify and determine the partial pressure of the gas present in the breathing mask in response to the optical signals received from the sensing element.

* * * * *